(12) United States Patent
Agoos et al.

(10) Patent No.: US 9,297,720 B2
(45) Date of Patent: Mar. 29, 2016

(54) GAS TURBINE ENGINE VANE EMBEDDED BEAM INTERRUPT OPTICAL TIP-TIMING PROBE SYSTEM

(71) Applicant: United Technologies Corporation, Hartford, CT (US)

(72) Inventors: Ian F. Agoos, New Haven, CT (US); Eli C. Warren, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 383 days.

(21) Appl. No.: 13/725,190

(22) Filed: Dec. 21, 2012

(65) Prior Publication Data

US 2014/0208837 A1 Jul. 31, 2014

(51) Int. Cl.
*G01M 15/14* (2006.01)
*F01D 9/06* (2006.01)
*F01D 17/08* (2006.01)

(52) U.S. Cl.
CPC ............... *G01M 15/14* (2013.01); *F01D 9/065* (2013.01); *F01D 17/08* (2013.01); *Y02T 50/672* (2013.01); *Y10T 29/49229* (2015.01)

(58) Field of Classification Search
CPC ...................................................... G01M 15/14
USPC ........................................ 73/112.01, 112.03
See application file for complete search history.

(56) References Cited

U.S. PATENT DOCUMENTS

| | | | |
|---|---|---|---|
| 4,132,114 A | 1/1979 | Shah et al. | |
| 4,139,822 A | 2/1979 | Urich et al. | |
| 4,240,706 A | 12/1980 | Douglas | |
| 4,329,644 A | 5/1982 | Libertini et al. | |
| 4,433,584 A | 2/1984 | Kokoszka et al. | |
| 5,349,850 A | 9/1994 | Young | |
| 5,404,760 A | 4/1995 | Robinson et al. | |
| 5,557,099 A | 9/1996 | Zielinski et al. | |
| 6,473,705 B1 * | 10/2002 | Conners | 702/100 |
| 6,575,011 B1 | 6/2003 | Busby et al. | |
| 6,894,492 B1 | 5/2005 | Dziech | |
| 7,328,624 B2 | 2/2008 | Gysling et al. | |
| 7,414,413 B2 | 8/2008 | Crum et al. | |
| 7,527,471 B2 | 5/2009 | Schilling | |
| 7,545,518 B2 | 6/2009 | Heyworth | |
| 7,866,213 B2 | 1/2011 | Twerdochlib | |
| 7,891,938 B2 | 2/2011 | Herron et al. | |
| 7,987,725 B2 | 8/2011 | Twerdochlib | |
| 8,033,719 B2 | 10/2011 | Beutin et al. | |
| 8,066,816 B2 | 11/2011 | Asplund et al. | |
| 8,126,662 B2 | 2/2012 | Twerdochlib | |
| 8,151,647 B2 | 4/2012 | Twerdochlib | |
| 8,164,761 B2 | 4/2012 | Kominsky | |
| 8,273,187 B2 | 9/2012 | Asplund et al. | |
| 2001/0026666 A1 | 10/2001 | Ferrera et al. | |
| 2003/0217772 A1 * | 11/2003 | Lu et al. | 137/554 |
| 2007/0001109 A1 | 1/2007 | Heyworth | |
| 2008/0310804 A1 * | 12/2008 | Brummel et al. | 385/115 |
| 2010/0074727 A1 | 3/2010 | Twerdochlib | |

(Continued)

OTHER PUBLICATIONS

International search report for PCT/US2013/075705 dated Apr. 8, 2014.

*Primary Examiner* — Eric S McCall
(74) *Attorney, Agent, or Firm* — O'Shea Getz P.C.

(57) ABSTRACT

A method of observing an airflow passage within a gas turbine engine includes locating a support in view of an airflow passage and housing an optical fiber within the support.

18 Claims, 9 Drawing Sheets

(56) References Cited

U.S. PATENT DOCUMENTS

| | | | |
|---|---|---|---|
| 2010/0076703 A1* | 3/2010 | Twerdochlib | 702/56 |
| 2010/0272557 A1* | 10/2010 | Woodmansee et al. | 415/118 |
| 2011/0013846 A1* | 1/2011 | Hori | 382/218 |
| 2011/0025844 A1* | 2/2011 | Hori | 348/135 |
| 2011/0069165 A1 | 3/2011 | Zombo et al. | |
| 2012/0101769 A1 | 4/2012 | Zombo et al. | |
| 2012/0154813 A1* | 6/2012 | Li et al. | 356/437 |
| 2014/0376588 A1* | 12/2014 | Wang et al. | 374/121 |

* cited by examiner

GAS TURBINE ENGINE VANE EMBEDDED BEAM INTERRUPT OPTICAL TIP-TIMING PROBE SYSTEM

BACKGROUND

The present disclosure relates to a gas turbine engine and, more particularly, to an optical tip-timing probe system therefor.

Gas turbine engines, such as those that power modern commercial and military aircraft, generally include a compressor section to pressurize an airflow, a combustor section for burning a hydrocarbon fuel in the presence of the pressurized air, and a turbine section to extract energy from the resultant combustion gases.

Beam Interrupt probes for optical tip-timing typically require two (2) "periscope" probes per channel. Arrangements that involve protrusion of the end of the "periscope" into the flow passage may not be desirable because exposure to the full effects of the hot compressed gases. To minimize the protrusion, the periscope may be designed to "look" obliquely into the flow passage. However, such an arrangement has the disadvantage that the probe's field of view may be undesirably limited and cannot readily be altered significantly because such alteration requires modification to the engine structure.

Furthermore, "Periscope" probes may disturb the aerodynamic behavior in the gas-path thereby driving additional (non-production related) vibration in rotating hardware. For this reason the use of "periscope" Beam Interrupt probes in the high pressure compressor (HPC)—particularly the aft stages—has been abandoned, despite the advantages inherent in a Beam Interrupt probes' dual measurement over a traditional spot probe's single measurement capability.

SUMMARY

A method of observing an airflow passage within a gas turbine engine according to one disclosed non-limiting embodiment of the present disclosure includes locating a support in view of an airflow passage and housing an optical fiber within the support.

In a further embodiment of the foregoing embodiment, the method further comprising locating the support within static structure.

In a further embodiment of any of the foregoing embodiments, the method locating the support within a leading edge of an airfoil.

In a further embodiment of any of the foregoing embodiments, the method further comprising locating the support within a trailing edge of an airfoil.

In a further embodiment of any of the foregoing embodiments, the method further comprising housing a second optical fiber within a second support in view of the optical fiber.

In a further embodiment of any of the foregoing embodiments, the method further comprising housing a second optical fiber within a second support opposite the optical fiber to define a beam across the airflow passage. In the alternative or additionally thereto, the foregoing embodiment further comprising angling the beam with respect to an engine axis of rotation.

A method of observing blades within a gas turbine engine, according to another disclosed non-limiting embodiment of the present disclosure includes housing a first optical fiber in a trailing edge of an airfoil and housing a second optical fiber in a leading edge of an airfoil in view of the first optical fiber.

In a further embodiment of the foregoing embodiment, the method further comprising defining a beam across an airflow passage. In the alternative or additionally thereto, the foregoing embodiment further comprising: angling the beam with respect to an engine axis of rotation.

An observation system for a gas turbine engine according to another disclosed non-limiting embodiment of the present disclosure includes a support and an optical fiber within said support.

In a further embodiment of the foregoing embodiment, the support is a hypo tube.

In a further embodiment of any of the foregoing embodiments, the support is less than approximately 0.04 inches (1 mm) in diameter.

In a further embodiment of any of the foregoing embodiments, the optical fiber is approximately 0.002-0.008 inches (50-200 microns) in diameter.

In a further embodiment of any of the foregoing embodiments, the optical fiber is not coupled to an optical lens.

In a further embodiment of any of the foregoing embodiments, the support is mounted within an airfoil.

In a further embodiment of any of the foregoing embodiments, the support is mounted within a leading edge of an airfoil.

In a further embodiment of any of the foregoing embodiments, the support is mounted within a trailing edge of an airfoil.

In a further embodiment of any of the foregoing embodiments, the support is mounted within a High Pressure Compressor vane.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
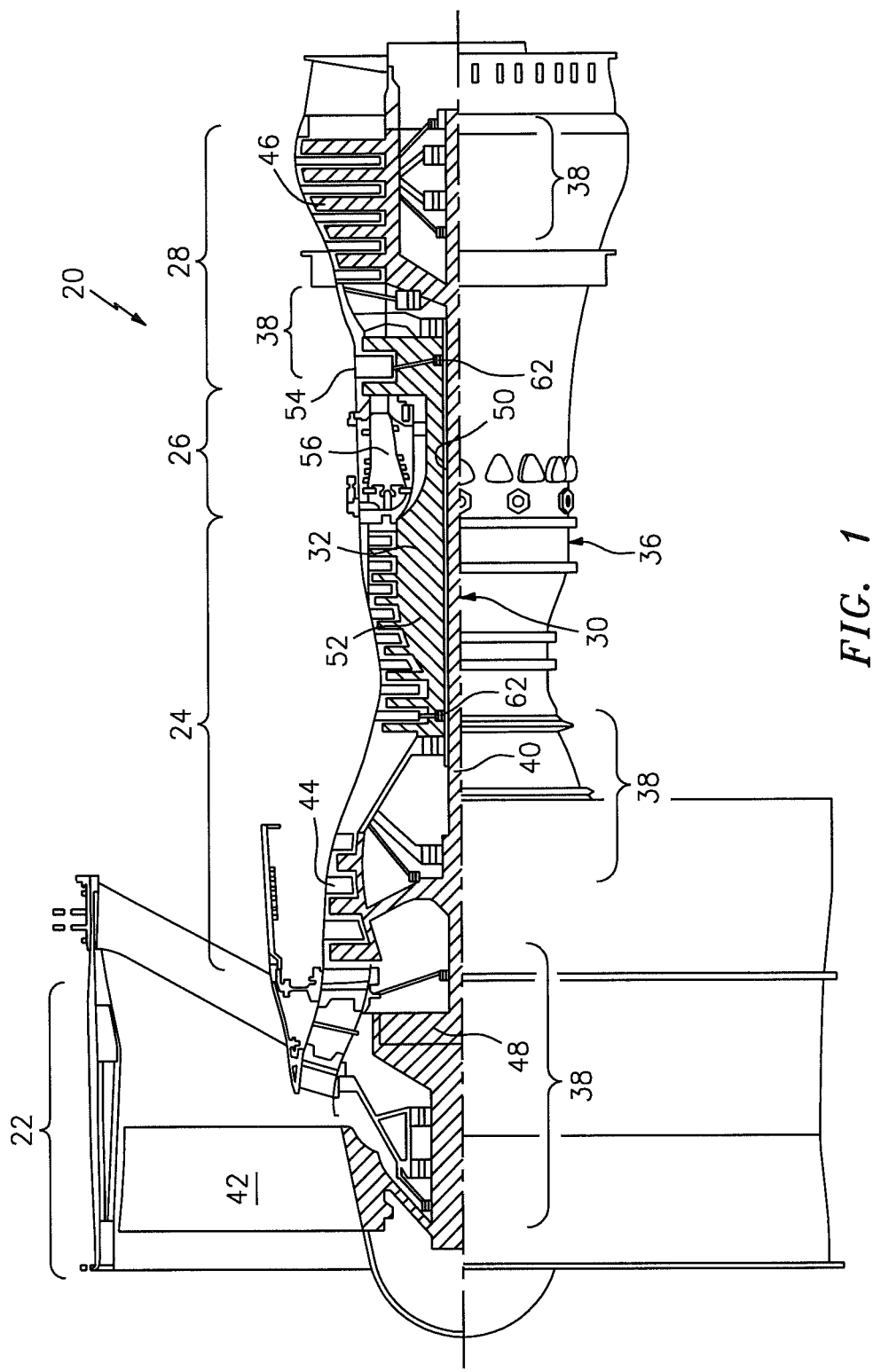
FIG. 1 is a schematic cross-section of an example gas turbine engine architecture.
Figure 2:
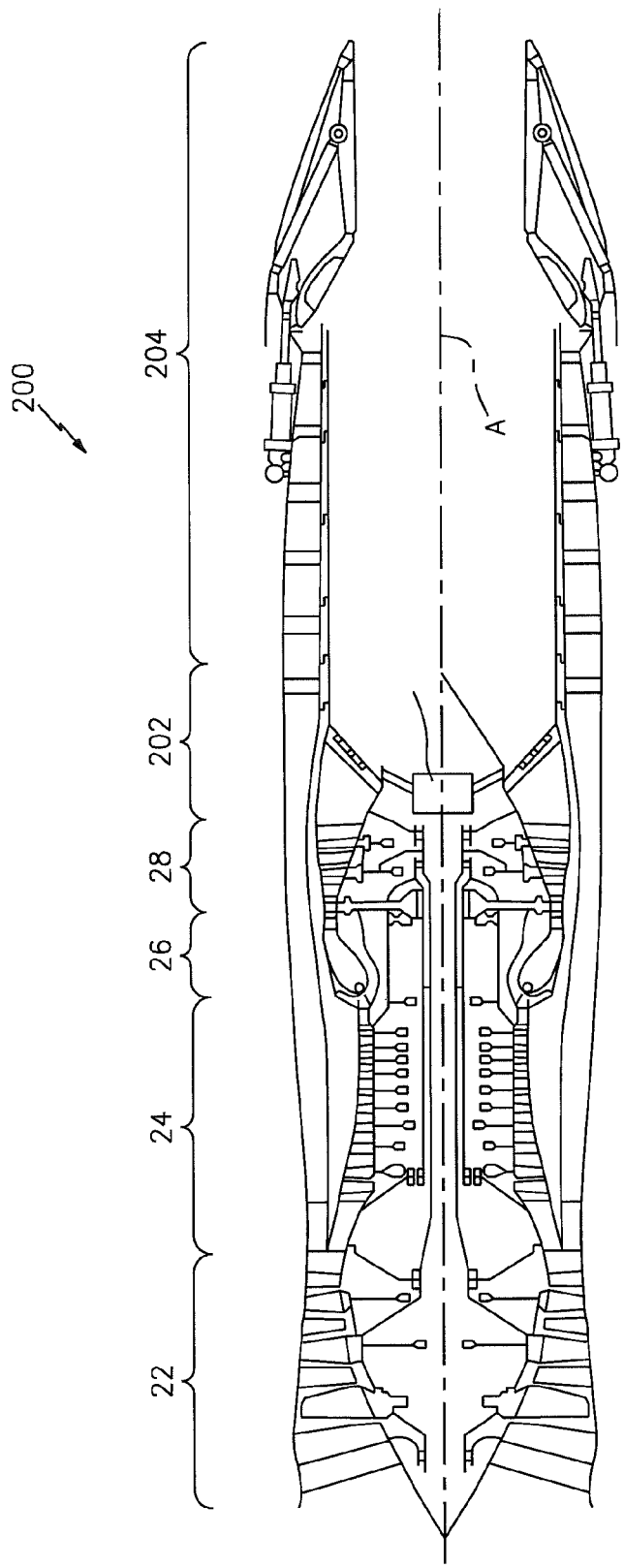
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engine architectures 200 might include an augmentor section 202 and exhaust duct section 204 (FIG. 2) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a low bypass augmented turbofan (FIG. 2), turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by bearing structures 38 within the static structure 36. It should be understood that various bearing structures 38 at various locations may alternatively or additionally be provided.

Figure 3:
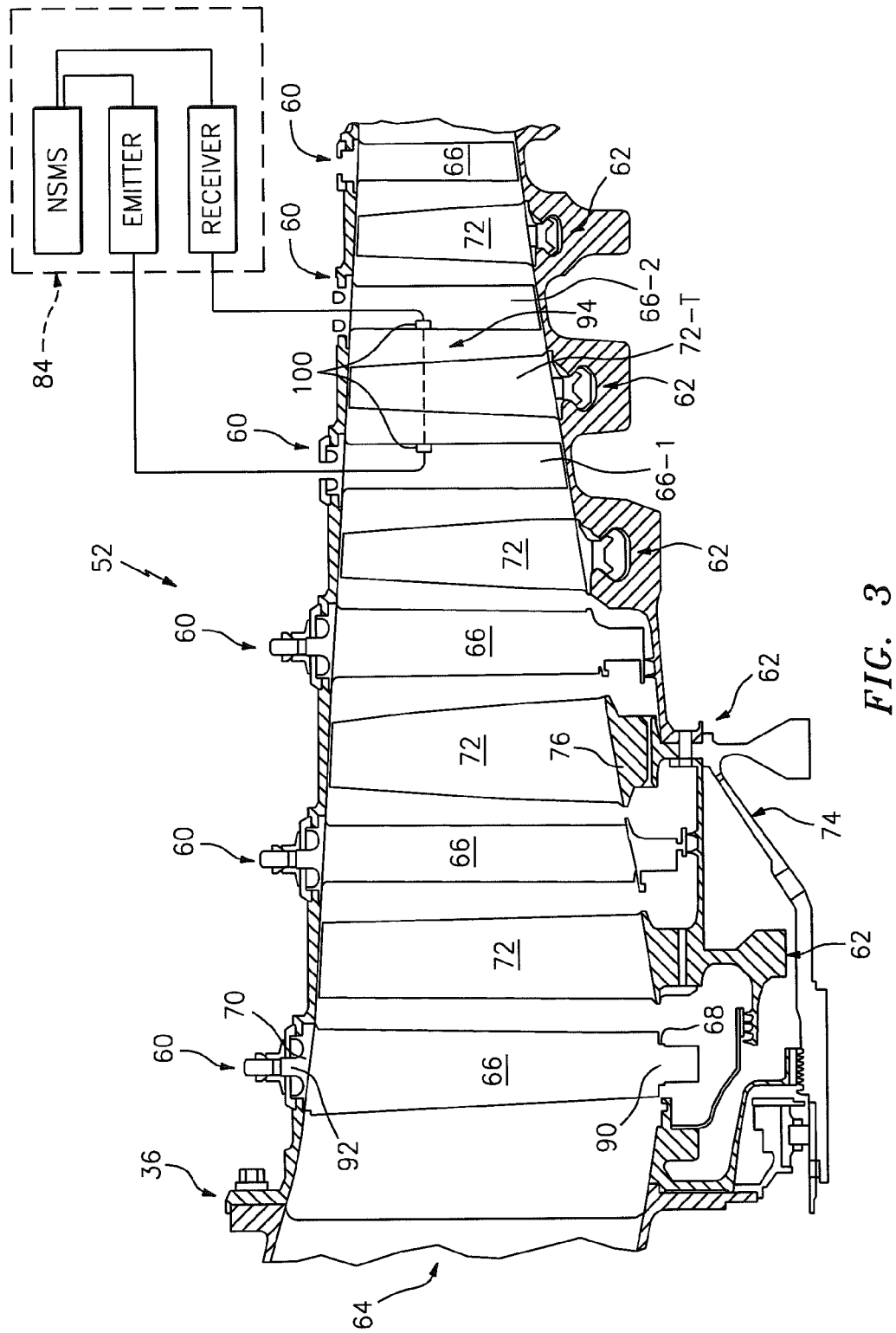
FIG. 3 is an expanded view of a High Pressure Compressor section of an example gas turbine engine.

With reference to FIG. 3, the HPC 52 generally includes a multiple of stages with alternate stationary vane assemblies 60 and rotational rotor assemblies 62 along an HPC airflow passage 64. Although the HPC 52 is illustrated in the disclosed non-limiting embodiment, other engine sections will also benefit herefrom. Moreover, although a particular number of HPC stages are illustrated, it should be appreciated that any number of stages will benefit herefrom.

Each of the vane assemblies 60 are mounted to the engine static structure 36 and include a multiple of airfoils 66 between a radial inner platform 68 and a radial outer platform 70. In one disclosed non-limiting embodiment, a first sidewall 86 is convex and defines a suction side of airfoil 66, and a second sidewall 88 is concave and defines a pressure side of airfoil 66 (also shown in FIG. 4). Sidewalls 86, 88 are joined at the leading edge 96 and at an axially-spaced trailing edge 98 (also shown in FIG. 4). More specifically, the airfoil trailing edge 98 is spaced chordwise and downstream from the airfoil leading edge 96. The sidewalls 86 and 88, respectively, extend longitudinally or radially outward in span from an airfoil root 90 to a stem 92. It should be appreciated that the airfoils 66 may be variable—shown as the first three (3) stages—or fixed—shown as the last three (3) stages—stator vanes within the HPC 52 that may combine both. In the exemplary embodiment, each airfoil 66 may be manufactured utilizing a metallic alloy such as, but not limited to, titanium or a composite material.

Each of the rotor assemblies 62 includes a multiple of blades 72 supported by a respective rotor assembly 74. The radial inner platform 68 and the radial outer platform 70 of the vane assemblies 60 and a platform 76 that extends from each of the multiple of blades 72 generally bounds the HPC airflow passage 64.

In order to facilitate observation of the blades 72 to, for example, facilitate operations of a Non-Interference Stress Measurement System (NSMS; illustrated schematically at 84), an observation system 94 with optical tip timing probes 100 is located within the HPC airflow passage 64 in an airfoil 66-1 forward of the target blades 72-T and in an airfoil 66-2 aft of the target blades 72. The NSMS determines an actual time of arrival from the optical tip-timing probes 100 that is then referenced to a theoretical time of arrival such that the resultant delta may then be converted to deflection, which then, in turn, is converted to stress/strain measurements. It should be appreciated that other measurements may be determined with the observation system 94 such as temperature measurements. Furthermore, although disclosed in a gas turbine engine environment, the optical tip timing probes 100 may be used for gathering tip-timing data for any type of rotating machinery that experiences vibratory stresses and/or cracking.

Figure 4:
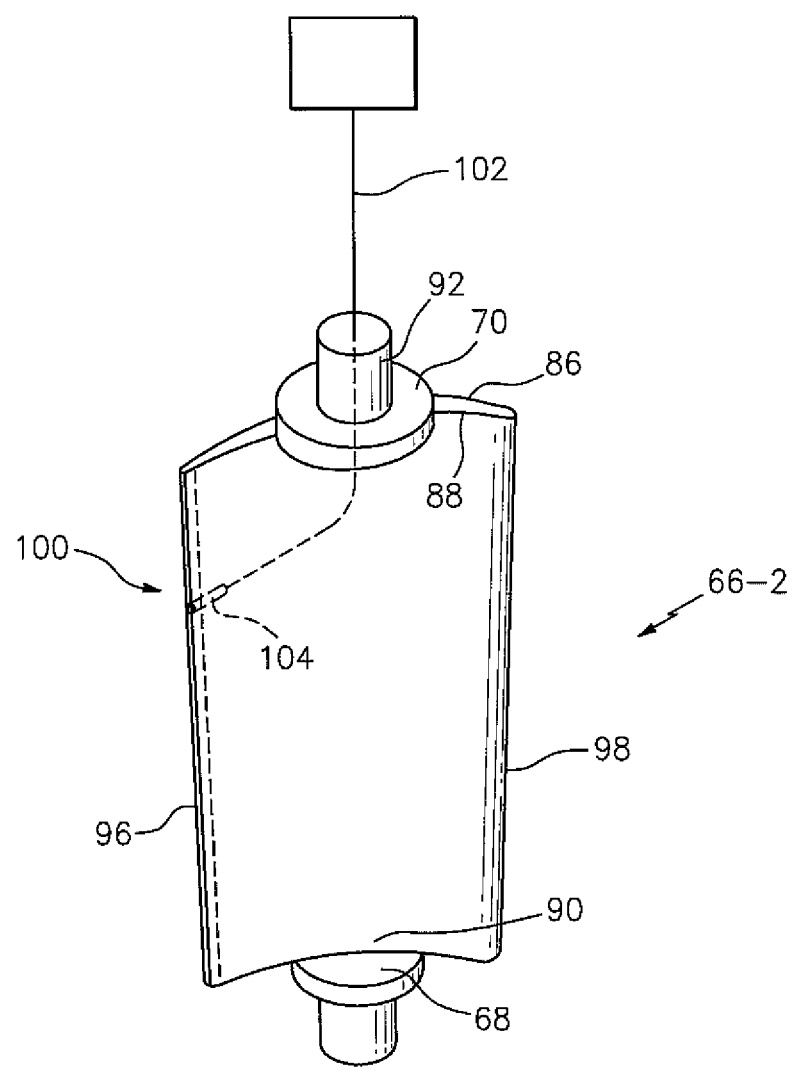
FIG. 4 is an expanded perspective view of a High Pressure Compressor fixed airfoil according to one disclosed non-limiting embodiment with an optical tip timing probe mounted in a leading edge thereof.
Figure 5:
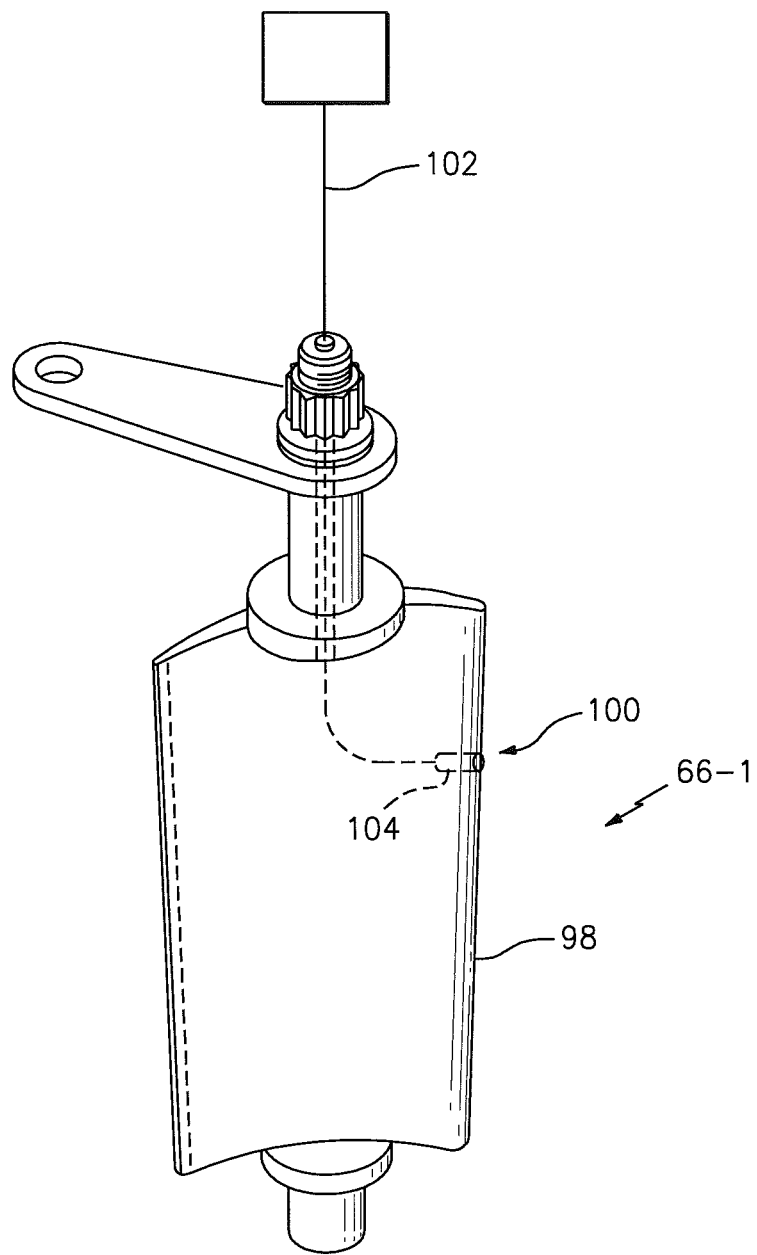
FIG. 5 is an expanded perspective view of a High Pressure Compressor variable airfoil according to one disclosed non-limiting embodiment with an optical tip timing probe mounted in a trailing edge thereof.

With reference to FIG. 4, each of the optical tip timing probes 100 generally includes an optical fiber 102 housed within a support 104 such as a hypo tube. The support 104 may readily brazed directly into the airfoil 66-1, 66-2 (FIG. 5). It should be appreciated that alternative installations will also benefit herefrom as well as alternate or additional positions within other static structure.

The optical tip timing probes 100 avoid the typical "periscope" of a relatively substantial probe body and lens arrangement required for support and protection within the gas path. The airfoils 66 themselves form the "periscope" which significantly reduces disturbances to the aero environment. That is, only small modification to the airfoils 66 to accommodate the fibers 102 is required rather than having the invasive cylinders of a traditional "periscope" probe.

The optical fiber 102, in one disclosed non-limiting embodiment, is typically approximately 0.002-0.008 inches (50-200 microns) in diameter. As the optical tip timing probe 100 is only approximately the diameter of the support 104 the optical tip timing probes 100 may be less than approximately 0.04 inches (1 mm) in diameter compared to a conventional "periscope" probe that is often approximately 0.375 inches (10 mm) as such probes are typically actively cooled. The optical tip timing probes 100 are thereby relatively easily mounted within the trailing edge 98 or the leading edge 96 (FIG. 3) of the respective airfoils 66-1, 66-2. It should be appreciated that the optical tip timing probes 100 are most typically installed in a fixed airfoil, however, variable airfoils and other structure will also benefit herefrom.

Figure 6:
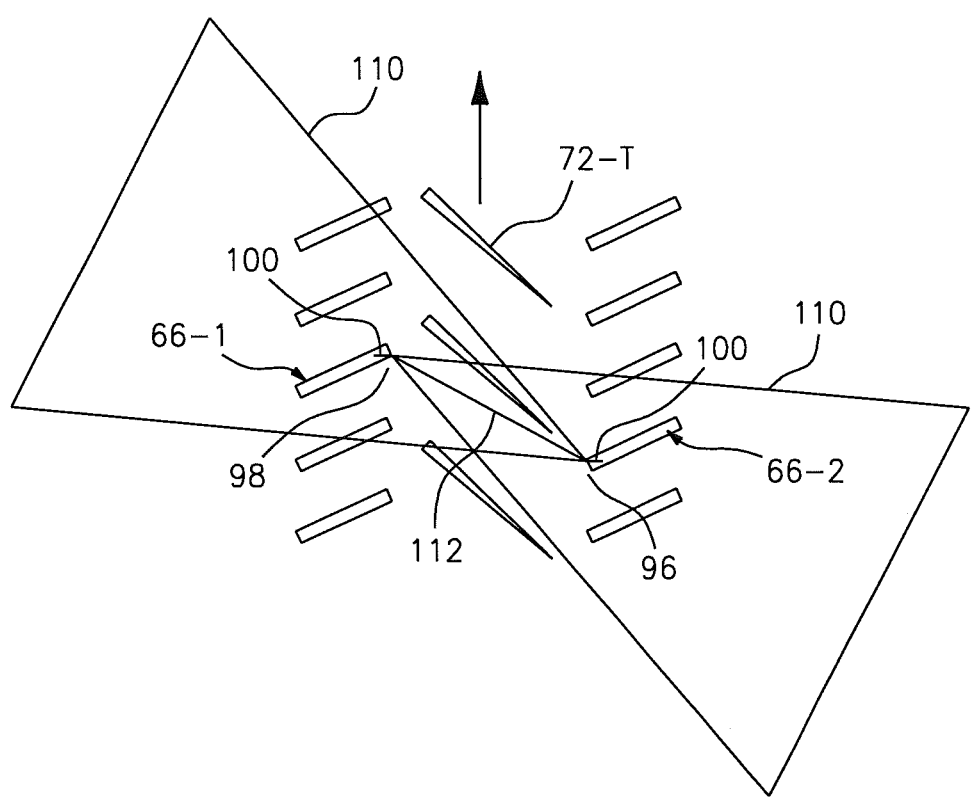
FIG. 6 is an schematic radial-inward view of a section of the example gas turbine engine with an optical system mounted therein.

With reference to FIG. 6, one optical tip-timing probes 100 is located within the trailing edge 98 of the airfoil 66-1 forward of the target blades 72-T and another optical tip-timing probe 100 is located within the leading edge 96 of the airfoil 66-2 aft of the target blades 72-T. The optical tip timing probes 100 are thereby directed toward each other such that one optical tip timing probe 100 operates as an emitter and the other optical tip timing probe 100 operates as a receiver. It should be appreciated that the "transmit" and "receive" optical tip timing probes 100 are essentially the same with the distinguishing characteristic being which is attached to a laser and which is attached to a detector.

The unfocused "transmit" and "receive" optical fibers 102 define respective emission and reception cones 110 that, in the disclosed non-limiting embodiment are of approximately 44 degrees. A theoretical central "beam" 112 is the cylinder of light defined by the apertures of the transmit and receive fibers 102 given that the angle between the normal vectors of the transmit fiber exit plane is less than or equal to the Numerical Aperture (N.A.) of the receive optical fiber 102. The Numerical Aperture (N.A.) is defined herein as the angle with respect to the normal vector of the exit plane of the fiber at which incidence light will transmit through the fiber 102. That is, so long as the apertures of the transmit and receive fibers 102 are within the respective transmission and reception cones 110, the beam 112 will be extant.

Figure 7:
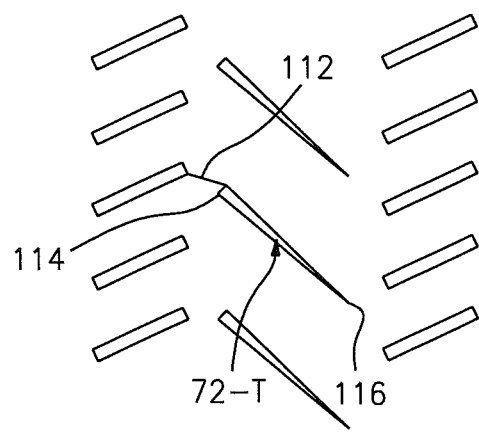
FIG. 7 is an schematic radial-inward view of a section of the example gas turbine engine with a target blade in a first position illustrating a first signal.
Figure 8:
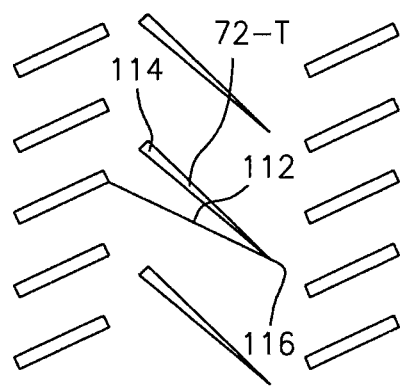
FIG. 8 is an schematic radial-inward view of a section of the example gas turbine engine with a target blade in a second position illustrating a second signal.
Figure 9:
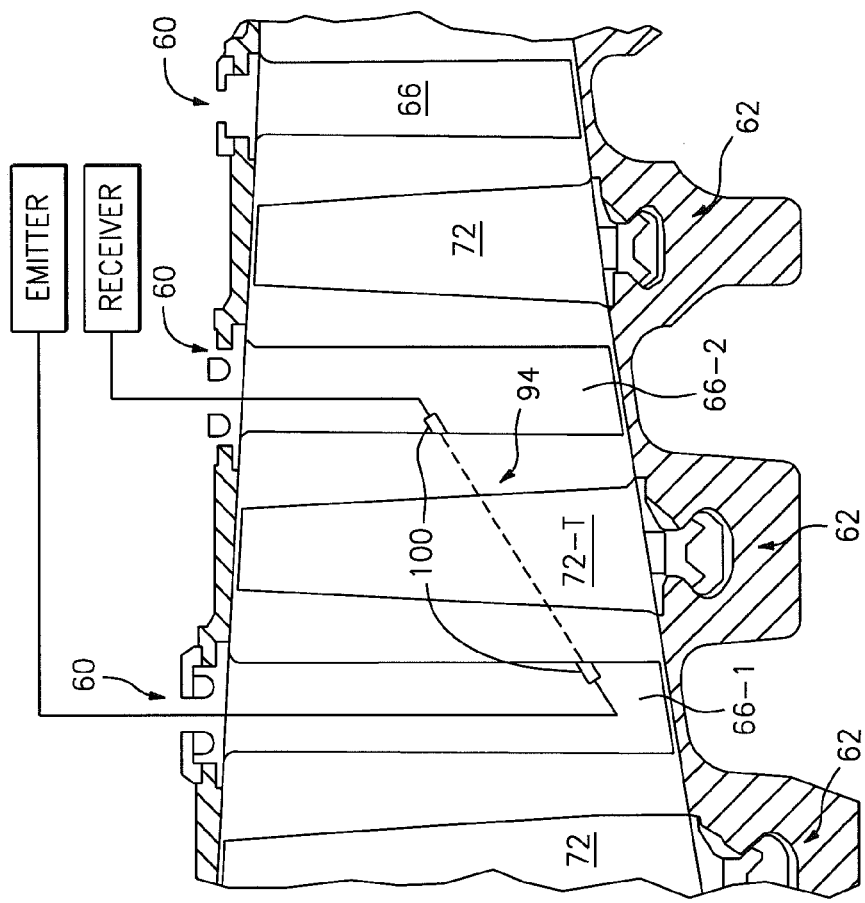
FIG. 9 is an schematic sectional view of a section of the example gas turbine engine with an optical system mounted therein.

The two optical tip timing probes 100 operate as beam interrupt probes that provide two measurements per channel—one when a blade leading edge 114 of the blade 72-T breaks the beam (FIG. 7), and a second when a blade trailing edge 116 passes the beam and is restored (FIG. 8). In addition, the two optical tip timing probes 100 may be positioned such that the central "beam" 112 may be angled with respect to the engine axis A so that the intercept upon the blade leading edge 114 of the blade 72 may be located at a different span distance compared to the intercept upon the trailing edge 114 (FIG. 9).

It should be appreciated that other measurements may be determined with the observation system 94 such as a spot probe single measurement. Furthermore, the integral nature of the optical tip timing probes 100 may lend themselves to a condition monitoring application such as a Health and Usage Monitoring System (HUMS), not just test and development applications.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of embedding a probe in an airflow passage within a gas turbine engine, the method comprising:
housing a first optical fiber within a support, the support in view of an airflow passage;
housing a second optical fiber within a second support opposite the first optical fiber to define a beam across the airflow passage; and
locating the support within an airfoil;
wherein the gas turbine engine comprises a rotor blade within the airflow passage, and the rotor blade is operable to disrupt the beam across the airflow passage.

2. The method as recited in claim 1, wherein the airfoil is a static structure.

3. The method as recited in claim 1, further comprising: locating the support within a leading edge of the airfoil.

4. The method as recited in claim 1, further comprising: locating the support within a trailing edge of the airfoil.

5. The method as recited in claim 1, further comprising: angling the beam with respect to an engine axis of rotation.

6. A method of embedding a probe within a gas turbine engine, the method comprising:
housing a first optical fiber in a trailing edge of an airfoil; and
housing a second optical fiber in a leading edge of an airfoil in view of the first optical fiber;
wherein the gas turbine engine comprises a rotor blade operable to disrupt a line-of-sight between the first optical fiber and the second optical fiber.

7. The method as recited in claim 6, further comprising: defining a beam across an airflow passage.

8. The method as recited in claim 7, further comprising: angling the beam with respect to an engine axis of rotation.

9. An observation system for a gas turbine engine that comprises a rotor blade, the observation system comprising:
a support;
a first optical fiber within said support; and
a second optical fiber operable to form a beam with the first optical fiber and positioned opposite from the first optical fiber across an airflow passage;
wherein the first and the second optical fibers are arranged such that the rotor blade is operable to disrupt the beam; and
wherein said support is mounted within an airfoil.

10. The observation system as recited in claim 9, wherein said support is a hypo tube.

11. The observation system as recited in claim 9, wherein said support is less than approximately 0.04 inches (1 mm) in diameter.

12. The observation system as recited in claim 9, wherein said first optical fiber and/or said second optical fiber is approximately 0.002-0.008 inches (50-200 microns) in diameter.

13. The observation system as recited in claim 9, wherein said first optical fiber and/or said second optical fiber is not coupled to an optical lens.

14. The observation system as recited in claim 9, wherein said support is mounted within a leading edge of the airfoil.

15. The observation system as recited in claim 9, wherein said support is mounted within a trailing edge of the airfoil.

16. The observation system as recited in claim 9, wherein said support is mounted within a High Pressure Compressor vane.

17. An observation system for a gas turbine engine, comprising:
a first support mounted within an airfoil;
a second support;
a first optical fiber within the first support; and
a second optical fiber within the second support, the second optical fiber operable to form a beam with the first optical fiber and positioned opposite from the first optical fiber across an airflow passage;

wherein the observation system is configured as an optical rotor blade tip timing observation system.

18. The observation system of claim 17, wherein the first support is positioned upstream of the second support.

* * * * *